United States Patent
Simon et al.

(10) Patent No.: US 8,387,891 B1
(45) Date of Patent: Mar. 5, 2013

(54) PROGRAMMABLE THERMOSTAT TIME/TEMPERATURE DISPLAY AND METHOD

(75) Inventors: Timothy M. Simon, San Francisco, CA (US); Matthew T. Fisher, Reno, NV (US); Blaine M. Smith, Portland, OR (US)

(73) Assignee: Tim Simon, Inc., San Francisco, CA (US)

( * ) Notice: Subject to any disclaimer, the term of this patent is extended or adjusted under 35 U.S.C. 154(b) by 815 days.

(21) Appl. No.: 12/510,691

(22) Filed: Jul. 28, 2009

Related U.S. Application Data

(60) Provisional application No. 61/084,159, filed on Jul. 28, 2008.

(51) Int. Cl.
*G05D 23/00* (2006.01)
(52) U.S. Cl. ......................................... 236/46 R; 236/94
(58) Field of Classification Search .................. 236/46 R, 236/94; 62/157, 231
See application file for complete search history.

(56) References Cited

U.S. PATENT DOCUMENTS

| | | | |
|---|---|---|---|
| 6,196,467 B1 | 3/2001 | Dushane et al. | |
| 6,641,054 B2 | 11/2003 | Morey | |
| 7,055,759 B2 | 6/2006 | Wacker et al. | |
| 7,232,075 B1 | 6/2007 | Rosen | |
| 7,302,642 B2 | 11/2007 | Smith et al. | |
| 7,306,165 B2 | 12/2007 | Shah | |
| 7,360,717 B2* | 4/2008 | Shah | 236/46 R |
| 7,844,901 B1* | 11/2010 | Joseph | 715/716 |
| 2005/0194457 A1 | 9/2005 | Dolan | |
| 2008/0081594 A1* | 4/2008 | Lee | 455/412.2 |
| 2008/0207274 A1* | 8/2008 | Kim | 455/566 |

OTHER PUBLICATIONS

Wayne Dalton, Product Sheet for Wireless Control Z-Wave Enabled Thermostat, http://www.wayne-dalton.com/newsitem113.asp, 1 page, Sep. 11, 2008.

* cited by examiner

*Primary Examiner* — Marc Norman
(74) *Attorney, Agent, or Firm* — James F. Hann; Haynes Beffel & Wolfeld LLP

(57) ABSTRACT

A programmable thermostat time/temperature display has a continuous loop timeline with a plurality of temperature transition points along the timeline to define a plurality of timeline segments. Temperature and time IDs are displayable on the display and are associated with at least some of the timeline segments and temperature transition points. A thermostat can be programmed by touching a position on a touchscreen associated with a temperature transition point on a continuous loop timeline on the touchscreen. The touching step may be carried out by moving the first temperature transition point from a first position along the timeline to a second position along the timeline so to change the first timeline segment. An updated time ID may be selected for the first temperature transition point.

5 Claims, 3 Drawing Sheets

PROGRAMMABLE THERMOSTAT TIME/TEMPERATURE DISPLAY AND METHOD

CROSS-REFERENCE TO OTHER APPLICATIONS

This application claims the benefit of U.S. provisional patent application No. 61/084,159 filed 28 Jul. 2008, the disclosure of which is incorporated herein by reference.

BACKGROUND OF THE INVENTION

The present invention relates generally to thermostats used for heating and cooling systems, such as gas or electric forced air furnaces, gas or electric radiant heating furnaces, electric forced air air-conditioning systems, and electric heat pumps. Invention may also be suitable for other types of systems, including solar and solar electric heating and cooling systems.

Programmable thermostats typically use a screen, such as a liquid-crystal display (LCD), to display both operational functions and programming values. The user enters commands into the thermostat, such as for setting the current time and date and programming the thermostat, by pressing keys or pressing appropriate positions on a touch screen display. Programming conventional thermostats is often accomplished by selecting a series of different screens on the display. In addition, information relating to the status of the thermostat and the settings in the program controlling the thermostat is often accessible only by reviewing different screens on the display.

Although programmable thermostats hold out the promise of reducing the energy used by heating systems, the U.S. Environmental Protection Agency, which provides the ENERGY STAR certification for appliances and other devices, has expressed concern that potential energy savings are not being realized because of the difficulties consumers face trying to program conventional digital thermostats.

BRIEF SUMMARY OF THE INVENTION

A first aspect of the invention is directed to a time/temperature display for a programmable thermostat comprising a display with a continuous loop timeline displayable on the display. A plurality of temperature transition points are positionable along the timeline to define a plurality of timeline segments between said temperature transition points. Temperature IDs are displayable on the display and are associated with at least some of the timeline segments. Time IDs are displayable on the display and are associated with at least some of the temperature transition points. In some examples the display is a touchscreen display and the temperature transition points may be touch-addable temperature transition points, or touch re-positionable temperature transition points, or touch-removable temperature transition points, or a combination thereof.

Another aspect of the invention is directed to a method for programming a thermostat of the type having a touchscreen interface. The method comprises touching a position on a touchscreen associated with a temperature transition point on a continuous loop timeline on the touchscreen. The continuous loop timeline comprises a plurality of said temperature transition points therealong to create timeline segments extending between adjacent ones of the temperature transition points. The touchscreen also displays time IDs and temperature IDs associated with the temperature transition points. The temperature transition points comprise first and second temperature transition points with a first of the temperature transition segments extending from the first temperature transition point to the second temperature transition point. The touching step comprises moving the first temperature transition point from a first position along the timeline to a second position along the timeline so to change the first timeline segment. An updated time ID is selected for the first temperature transition point. In some examples the touching step further comprises adding a third temperature transition point along the timeline between the first and second temperature transition points, and selecting a third time ID and a third temperature ID for the third temperature transition point.

A further aspect of the invention is directed to a programmable thermostat of the type of comprising a housing and a display screen mounted to the housing. A user can program a plurality of target operating temperatures and at least one setback operating temperature associated with the target operating temperatures. A save energy physical input element, such as a pushbutton, is carried by the housing and is operable to toggle operation of the thermostat between a current target operating temperature and an associated setback operating temperature. In this way a user can change the current operating temperature from a current target operating temperature to the associated setback operating temperature by actuating the save energy physical input element. The user can also change the current operating temperature from a current setback operating temperature to an associated target operating temperature by actuating the save energy physical input element.

A still further aspect of the invention is directed to a method for toggling the operation of a programmable thermostat between a current target operating temperature and an associated setback operating temperature. The thermostat is of the type of comprising a housing and a display screen mounted to the housing. A user can program a plurality of target operating temperatures and at least one setback operating temperature associated with the target operating temperatures. A save energy physical input element, carried by the housing is actuated. Therefore, (1) when the current operating temperature is a current target operating temperature, the current target operating temperature is changed to an associated setback operating temperature, and (2) when the current operating temperature is a current setback operating temperature, the current setback operating temperature is changed to an associated target operating temperature. In some examples the save energy physical input actuating step comprises pressing a pushbutton.

Various features and advantages of the invention will appear from the following description in which the preferred embodiments have been set forth in detail in conjunction with the accompanying drawings.

DETAILED DESCRIPTION OF THE INVENTION

Figure 1:
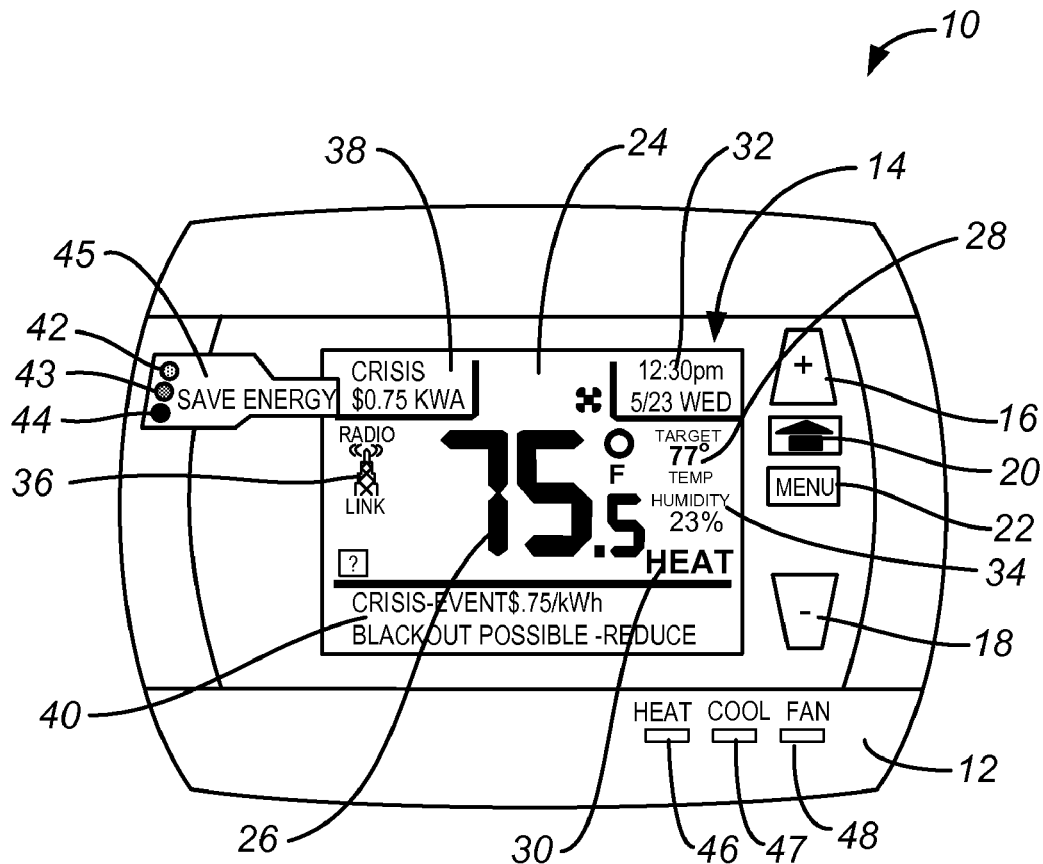
FIG. 1 is a front view of an example of a thermostat made according to the invention with the display showing a home position screen.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

FIG. 1 illustrates one example of a thermostat 10 made according to the invention. Thermostat 10 includes a body or housing 12 containing a touch screen display 14. Thermostat 10 also includes an increase or up input 16 and a decrease or down input 18 adjacent to display 14. Thermostat 10 also includes a home input 20 and a menu input 22. Touching home input 20 returns display 14 to a home screen 24, an example of which is shown in FIG. 1. In this example home screen 24 displays the current temperature 26, a target temperature 28, and a heat/cool mode indicator 30. Other information can also be provided, such as at a date and time indicator 32, humidity indicator 34, radio link indicator 36 and alphanumeric energy alert indicators 38, 40. When the existence or warning of a power crisis has been transmitted to thermostat 10, such as through a radio link, information regarding the energy crisis is provided at alphanumeric energy alert indicators 38, 40 and green, yellow and red status lights 42, 43, 44. In addition, the status of thermostat 10 is also indicated by illuminated heat, cool and fan indicators 46, 47 and 48. The various features described above can be of conventional or unconventional design. Examples of thermostats are disclosed in US patent application publication number US-2006-0186214-A1 published 24 Aug. 2006 and in U.S. Pat. No. 6,824,069 issued 30 Nov. 2004, the disclosures of which are incorporated by reference. Examples of power alert type of systems are shown in U.S. Pat. Nos. 6,671,586 issued 30 Dec. 2003 and 6,650,249 issued 18 Nov. 2003, the disclosures of which are incorporated by reference.

Thermostat 10 is preferably a programmable thermostat which allows the user to change the operating temperature over the course of the day and typically allowed each day to be programmed differently. For example, assume the thermostat is in a heating mode, a typical programmed heat profile is as follows: 62° F. from midnight to 6 AM; 70° F. from 6 AM to 8:30 AM; 64° F. from 8:30 AM to 4 PM; 68° F. from 4 PM to 10 PM; and 62° F. from 10 PM to midnight. The higher heating mode temperatures, 68° F. and 70° F. in this example, are typically called target temperatures or target operating temperatures while the lower heating mode temperatures, 62° F. and 64° F., are typically called the setback temperatures or setback operating temperatures. One problem with conventional programmable thermostats arises when a user wishes to change the operating temperature without having to reprogram the thermostat. For example, assume the user get up earlier than usual and leaves at 7 AM. There is typically no convenient way to permit the user to move the current operating temperature from the morning target temperature of 70° F. to the associated setback temperature of 64° F. Note that the associated setback temperature is typically the setback temperature following the current target temperature and the associated target temperature is the target temperature following the current setback temperature. To help address this problem, thermostat 10 comprises a save energy button 45 which allows a user to toggle the operating temperature of the thermostat between the current target temperature and the associated, that is the next, setback temperature by simply pressing button 45. Thus, in this example the user can simply press save energy button 45 at 7 AM causing the operating temperature change from 70° F. to the associated setback temperature of 64° F. at 7 AM instead of 8:30 AM. Similarly, if the user arrives early at, for example, 2:30 PM, simply pressing save energy button 45 causes the operating temperature to change from the current setback temperature of 64° F. to the associated operating temperature of 68° F.

Figure 2:
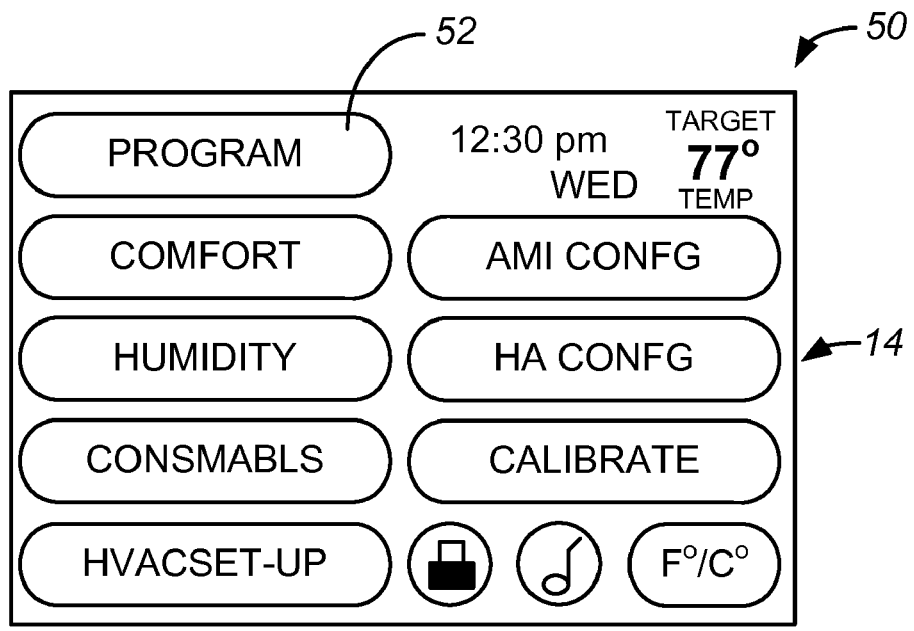
FIG. 2 shows a menu screen displayed after pressing the menu input of the thermostat of FIG. 1.

FIG. 2 illustrates a menu screen 50 which is shown on display 14 when menu input 22 is pressed. For purposes of this invention, what is important on menu screen 50 is program input 52 so that the other inputs will not be described. Pressing program input 52 causes a program screen 54 to be shown on display 14.

Figure 3:
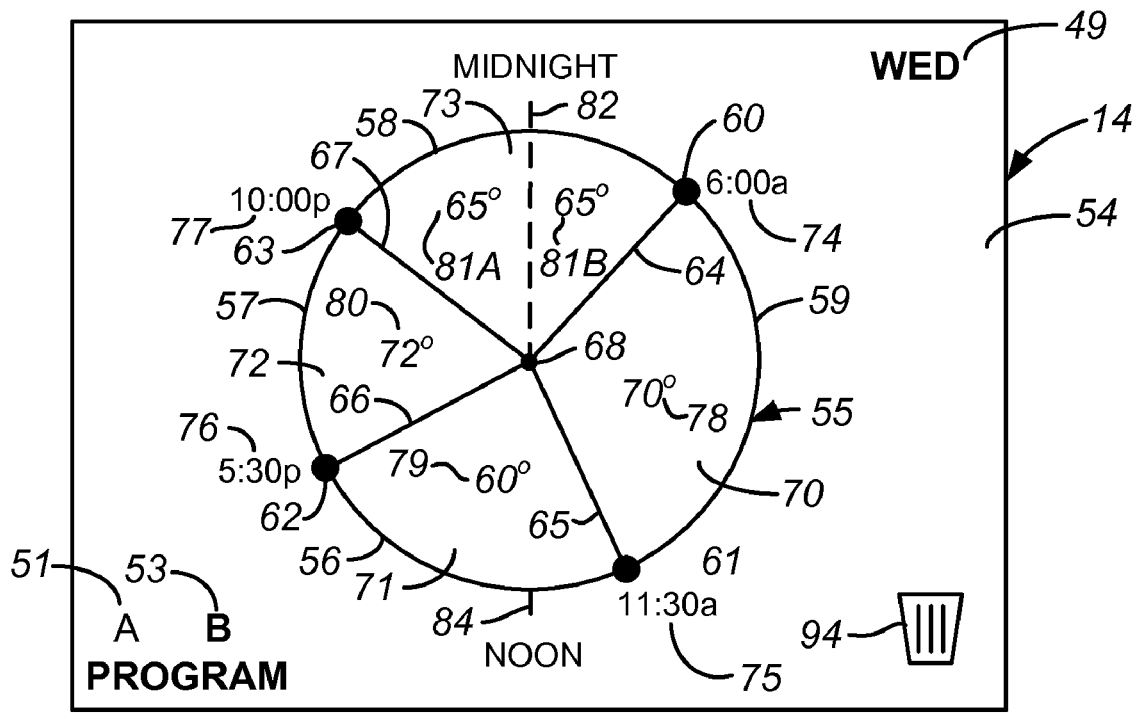
FIG. 3 shows a program screen, displayed after pressing the program input on the menu screen of FIG. 2, showing a continuous loop timeline.

Program screen 54, see FIG. 3, includes a day of the week input 49, a select program A input 51, a select program B input 53 and a continuous loop, typically round, timeline 55. In some examples the program displayed on program screen 54 upon pressing program input 52 is the program currently running. The appropriate program input 51, 53 is bolded to indicate which program is being displayed. The other program can be displayed by simply pressing the appropriate program input 51, 53. If no program is currently being run, in some examples program A input 51 is displayed. As discussed in more detail below, continuous loop timeline 55 shows the programming of the complete day on one screen and does not limit programming to any particular section of the day. In other examples three or more different programs may be selected.

Thermostat 10 is typically preprogrammed with first and second default programs. The first default program will typically have four time periods with EPA ENERGY STAR time periods and temperatures. The second default program will have, for example, six time periods, initially with factory-selected time periods and temperatures. In both cases the user can maintain, change, add or delete time periods and maintain or change temperatures.

Pressing program input 52 causes program screen 54 to be shown on display 14. In this example program screen 54 shows a current program having four time periods and four temperatures. Timeline 55 is divided into first, second, third and fourth timeline segments 56, 57, 58 and 59 by first, second, third and fourth temperature transition points 60, 61, 62 and 63. First, second, third and fourth segment lines 64, 65, 66 and 67 extend from a central point 68 and divide the timeline interior 69 into first, second, third and fourth time/temperature regions 70, 71, 72 and 73. Each temperature transition point has a time ID and a temperature ID associated with it. In the example shown in FIG. 3, first, second, third and fourth temperature transition points 60-63 have first, second, third and fourth time IDs 74-77 (6 a.m., 11:30 a.m., 5:30 p.m. and 10 p.m.) and first, second, third and fourth temperature IDs 78-81 (70° F., 60° F., 72° F., 65° F.). To help orient the user, display 14 has, in this example, two different fixed time positions along the timeline 55, a midnight time position 82 and a noon time position 84. In some examples only a single fixed time position, most typically midnight time position 82, may be used; in other examples three or more fixed time positions may be used.

Temperature transition point 63 has fourth temperature IDs 81A and 81B associated with it. Temperature ID 81B, to the right side of midnight, may have a different value than temperature ID 81A, to the left side of midnight. This can occur if the last temperature of the previous day is not the same as the last temperature of the current day. For example, if the last temperature of the previous day was 62° and the last temperature of the current day is 64°, temperature ID 81B will be 62° and a temperature ID 81A will be 64°.

Generally speaking, a user can program thermostat 10 using timeline 55 by one or more of the following: (1) changing the position of one or more temperature transition points, and the associated time IDs, along timeline 55, (2) adding one or more additional temperature transition points, and associated time and temperature IDs, along timeline 55, and (3) removing one or more temperature transition points, and associated time and temperature IDs, from timeline 55. These various procedures will be discussed below with reference to FIGS. 4-8. Programming thermostat 10 using timeline 55 does not preclude thermostat 10 also having the ability to be programmed in other conventional or unconventional manners.

A user can change selected temperature IDs by touching or pressing on the appropriate temperature ID and then using up and down inputs 16, 18 to make the desired change. Selected time IDs can also be changed in this way or through the procedure discussed below with regard to FIGS. 4 and 5.

Figure 4:
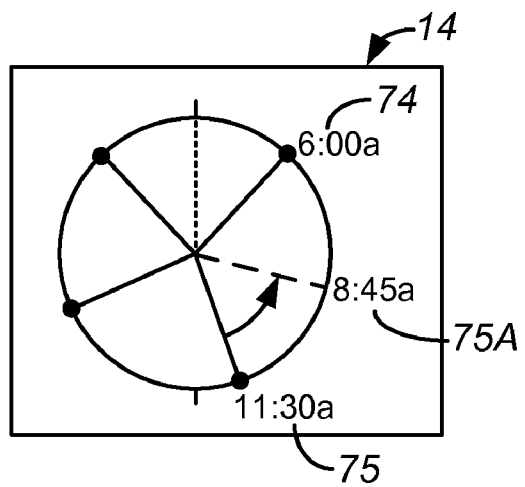
FIG. 4 shows the program screen of FIG. 3 illustrating moving a temperature transition point, and its associated segment line, from a first position to a second position along the timeline and showing a preliminary updated time ID for the temperature transition point.

FIG. 4 is a simplified view of the display of FIG. 3 illustrating moving of second temperature transition point 61 from the position of FIG. 3 to the position of FIG. 4. This causes display 14 to change the value of second time ID 75 to a preliminary updated second time ID 75A. In the example of FIG. 4, preliminary updated time ID 75A is automatically changed to a value between first time ID 74 and a second time ID 75 in an amount proportional to the distance along timeline segment 56 moved by second temperature transition point 61. For example, if second temperature transition point 61 is moved in FIG. 4 halfway between first and second temperature transition points 60, 61 of FIG. 3, the preliminary updated time ID 75A would be the time halfway between time IDs 74, 75, that is 8:45 a.m. Note that the temperatures in both time/temperature regions 70, 71 remain the same. The user can then make rough adjustments to preliminary updated time ID 75A by movement along timeline 55. More precise adjustments to preliminary updated time ID 75A can be made by touching ID 75A and then using the up or down inputs 16, 18 to arrive at the updated time ID 75B of FIG. 5. If the user does not do anything, updated time ID 75B will be the same as preliminary updated time ID 75A.

In some examples the preliminary updated second time ID 75A will have the same value as second time ID 75, that is 11:30 a.m. in an example of FIG. 3. In such examples the user will be required to adjust the time using up or down inputs 16, 18 to arrive at updated time ID 75B. Therefore, when a time ID or a temperature ID is displayed after adding or moving a temperature transition point, selecting a time ID and selecting a temperature ID can be carried out by either accepting what is initially displayed or by changing what is initially displayed.

Figure 5:
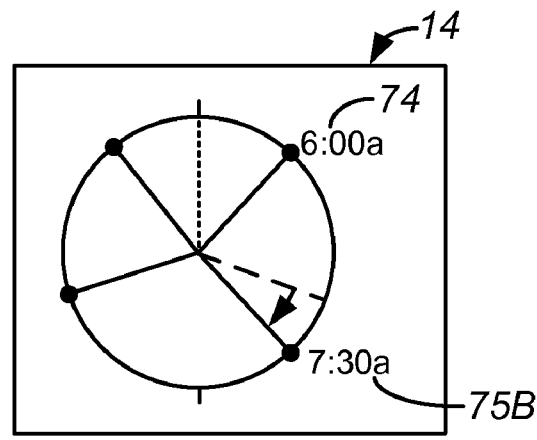
FIG. 5 illustrates the program screen of FIG. 4 after the preliminary updated time ID has been changed to an updated time ID.

By comparing the position of second segment lines 65 in FIGS. 4 and 5, it can be seen that the initial position of second segment lines 65 in FIG. 4 has been automatically repositioned to an adjusted position in FIG. 5. Thermostat 10 is programmed so that the actual positions of the temperature transition points and their associated segment lines are automatically moved so that each of the time/temperature regions is large enough to provide sufficient room for the display of the temperature IDs. Therefore, the locations of the temperature transition points and their associated segment lines do not necessarily correspond to their true 24 hour clock face location. For example, in FIG. 3 first temperature transition point of 60 is a position about one fourth of the way from midnight time position 82 and a noon time position 84, which corresponds generally to about 3 a.m. as opposed to the actual time of 6 a.m. In addition, in this example the program is structured so that all of the morning (a.m.) times remain on timeline 55 between the midnight time position 82 and the noontime position 84, moving in a clockwise direction, while all of the afternoon (p.m.) times remain on timeline 55 between noontime position 84 and a midnight time position 82. In some examples some or all of the time IDs may be located within timeline interior 69. Similarly, in some examples some or all of the temperature IDs may be located outside of timeline interior 69. Lead lines or other appropriate guidance may be used to ensure that the temperature IDs and time IDs are associated with the appropriate timeline segment, temperature transition point and time/temperature region.

Figure 6:
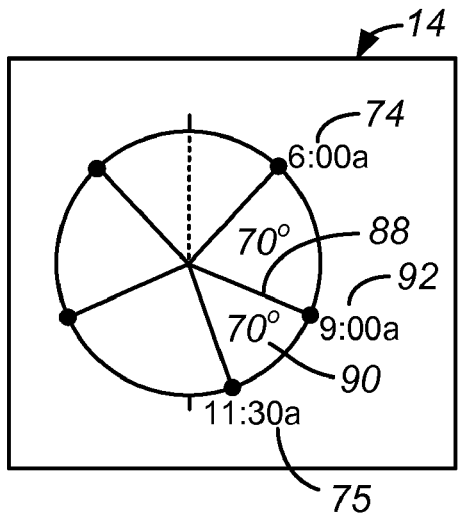
FIG. 6 shows the program screen of FIG. 3 after a new touch transition point has been added between the first and second touch transition points with a new temperature ID and a new time ID on the program screen.
Figure 7:
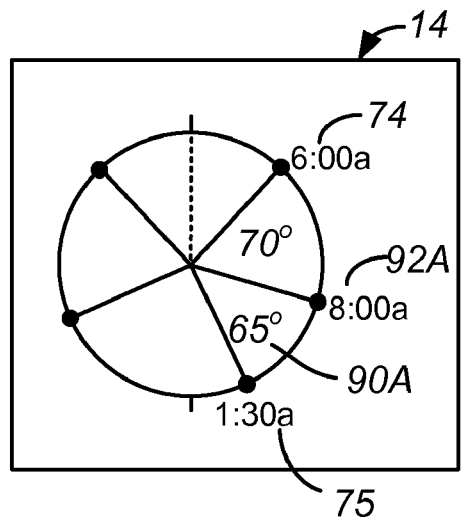
FIG. 7 shows the program screen of FIG. 6 with an updated time ID and an updated temperature ID.

FIG. 6 shows the display of FIG. 3 after a new touch transition point 86 has been added between first and second touch transition points 60, 61 of FIG. 3. Doing so causes a new segment line 88, a new temperature ID 90 and a new time ID 92 to be displayed. In this example new temperature ID 90 will have the same value as the immediately preceding temperature ID, and this example first temperature ID 74. The value of new time ID 92 will be chosen in the same manner as discussed above with regard to FIGS. 4 and 5, that is typically having a value proportional to the distance between first and second temperature IDs 78, 79, that is, 9 a.m. in this example. Updated new temperature and time IDs 90A, 92A, shown in FIG. 7, may be arrived at in the same manner as discussed above with regard to FIGS. 4 and 5.

Figure 8:
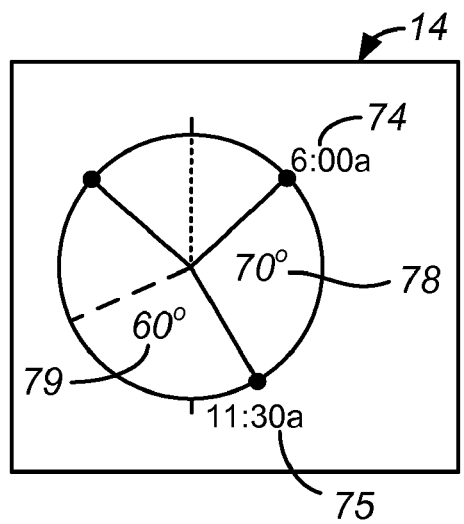
FIG. 8 shows results of removing the third temperature transition point causing the removal of the third segment line and third temperature ID from the program screen.

FIG. 8 shows results of removing third temperature transition point 62; doing so causes the removal of the third segment line 66 and third temperature ID 80 from display 14. This is achieved in this example by touching third temperature transition point 62 and a dragging it to the wastebasket icon 94. Doing so leaves the second temperature ID 79 for the entire time between second temperature transition point 61 and temperature transition point 63.

Other modification and variation can be made to the disclosed embodiments without departing from the subject of the invention as defined in following claims. For example, the shape of continuous loop timeline 55 can be other than round, such as oval, a regular or irregular polygon, or a nonspecific shape consisting of curved line segments, straight-line segments or both. While programming is typically accomplished by touching timeline 55 at a temperature transition point, such programming could also be accomplished by touching other positions, such as the segment lines or the timeline interiors. Up down inputs 16, 18 could be replaced by or supplemented by a numeric keypad. Also, program screen 54 could include up down inputs 16, 18. Other methods for removing a temperature transition point could be used, such as by tapping on the temperature transition point quickly two or three times. Time based on a 24 hour clock, which dispenses with a.m. and p.m., may be used.

Any and all patents, patent applications, and printed publications referred to above are incorporated by reference.

The invention claimed is:

1. A time and temperature display for a programmable thermostat comprising:
   a display;
   a continuous loop timeline displayable on the display;
   the continuous loop timeline defining a timeline interior;
   the continuous loop timeline having a central point;
   a plurality of temperature transition points positionable along the timeline to define a plurality of timeline segments between said temperature transition points;
   temperature IDs displayable on the display and associated with at least some of the timeline segments; and
   time IDs displayable on the display and associated with at least some of the temperature transition points; and
   segment lines extending from the central point to the temperature transition points to divide the timeline interior into time and temperature regions.

2. The time and temperature display according to claim 1, wherein at least some of the time IDs are positioned external of the timeline.

3. The time and temperature display according to claim 1, wherein at least some of the temperature IDs are positioned within the time and temperature regions.

4. The time and temperature display according to claim 3, wherein:
   the fixed time position comprises a midnight fixed time position and a noon fixed time position;
   the time IDs comprise a.m. time IDs for times between midnight and noon and p.m. time IDs for times between noon and midnight; and
   each of the temperature transition points associated with a.m. time IDs remain along the timeline between the midnight and noon fixed time positions and p.m. time IDs remain along the timeline between the noon and midnight fixed time positions.

5. A method for programming a thermostat of the type having a touchscreen interface, comprising:
   touching a position on a touchscreen associated with a temperature transition point on a continuous loop timeline on the touchscreen, the continuous loop timeline having a central point and defining a timeline interior, the continuous loop timeline comprising a plurality of said temperature transition points therealong to create timeline segments extending between adjacent ones of the temperature transition points, segment lines extending from the central point to the temperature transition points to divide the timeline interior into time and temperature regions, the touchscreen also displaying time IDs and temperature IDs associated with the temperature transition points, the plurality of temperature transition points comprising first and second temperature transition points with a first of the temperature transition segments extending from the first temperature transition point to the second temperature transition point;
   the touching step comprising moving the first temperature transition point from a first position along the timeline to a second position along the timeline so to (1) change the first timeline segment, and (2) move the segment line extending from the central point to the first temperature transition point; and
   selecting an updated time ID for the first temperature transition point.

* * * * *